Patented Jan. 19, 1932

1,841,667

UNITED STATES PATENT OFFICE

HERMAN C. NIELSEN, OF HOWARD CITY, MICHIGAN, ASSIGNOR TO NATIONAL WOOD PRODUCTS COMPANY, OF DETROIT, MICHIGAN, A CORPORATION OF DELAWARE

MASTIC COMPOSITION

No Drawing.   Application filed May 23, 1930.   Serial No. 455,145.

The present invention relates to a mastic composition suitable for laying wood block flooring, wainscoting, tiles, linoleum, composition floors, these being laid on wood sub-floors, or on concrete or composition flooring, plaster walls and the like. In recent years many floors have been laid, consisting of square or rectangular wooden blocks, say three-quarter inch to one inch in thickness, and from four to twelve inches square, or rectangular pieces of similar sizes, these being in many cases provided with tongue and groove edges. The blocks may be nailed to the sub-flooring but in many cases it is found advisable to lay the same in a mastic or composition which acts as a binder, said binder being in many cases applied in a hot and soft or molten condition, which hardens after thoroughly cooling, and in some cases compositions have been used which never do really harden although they may stiffen up somewhat.

In accordance with the present invention a composition of the type of the above mastic composition is produced, which composition remains permanently soft and plastic, sufficiently to allow slight movement of the blocks relative to the sub-flooring, when necessary or desirable.

In making the composition of the present case, I use rosin, preferably gum rosin although wood rosin can be used. This is mixed with a mineral oil, say paraffin oil which may be a refined oil of about the same gravity and viscosity as is commonly used as a motor oil in automobiles. These two components are mixed together and heated after which molten sulfur is added thereto, it being advisable that the two materials should be at approximately the same temperature during the mixing operation, and the mixture is thoroughly stirred while still hot.

The sulphur reacting with the rosin or mineral oil or both, produces a more or less rubbery constituent, and prevents the separation of the oil and rosin from the sulphur.

After allowing the mixture to cool, say to ordinary atmospheric temperature, a small amount of rice flour or similar starchy material is added, to give the proper consistency. The consistency of the final mass may be approximately that of "vaseline" or a little thicker than this, but the composition is preferably substantially softer than ordinary chewing gum.

In a specific example 50 parts of rosin were mixed with 20 parts of mineral oil ("medium" automobile oil), and the mixture heated to 216° F. While at this temperature 20 parts of molten sulphur at 253° F., were added to the mixture this being added in a slow stream, while the mixture was being well agitated, in order to thoroughly mix the same. On cooling, the product was found to be a semi-liquid somewhat rubbery mass, and 10 parts of rice flour were added slowly, stirring the mixture during such addition, and this gave a very satisfactory consistency, rather softer than ice cold butter, and of a hardness resembling "vaseline" or lard at room temperature.

A small amount of this pasty mass is spread upon a wooden floor, and the blocks as above referred to were laid directly in the mixture, care of course being taken not to get any of this mixture on the top of the blocks, which might stain them somewhat.

The rosin used may be water-white or may be yellow or even brown, and if water-white rosin is used, the final composition may be of a somewhat yellowish color, not very different from the color of maple wood or birch wood. Each block is pressed firmly into place, for example by stepping on the same, and preferably only a small portion of the floor is coated with the composition, at a time.

In laying top flooring on a wooden or other sub-flooring, it frequently occurs that uneven places occur in the sub-flooring. For evening up these places I may use some of the above composition mixed with an equal amount of sawdust or wood flour, in order to build the same up level, this being troweled and pressed to give a firm and smooth foundation. Then the layer of the mastic is applied upon this, after the same has been allowed to stand a while to harden.

The composition can be used at ordinary room temperature, not only for laying blocks as above referred to, but for sticking down linoleum, tile, rugs, canvas or various other materials.

In addition to firmly holding the boards in place, the composition seems to act as a deadener of sound and an insulator of heat and cold, and the sulfur therein acts as a powerful antiseptic to prevent decay.

It is my belief that there is some kind of a chemical reaction between the sulphur and the rosin to give the rubbery consistency above referred to. The adherence of the block to the floor is excellent, but as the sub-flooring shifts a little due to settlement of the building, in the course of years, the composition will allow the blocks to move slightly to prevent bulging or unevenness of the floor so laid.

The proportions above referred to have been given in an illustrative sense only, and I do not restrict myself to these exact proportions. Thus the rosin may vary, say from 40 to 55%, and the oil can vary from about 15 to 25%, and the character of the oil can also vary somewhat, oils somewhat heavier and more viscous than those mentioned being sometimes more suitable, for example in the laying of linoleum. The amount of sulphur likewise can be varied more or less, say from about 15% up to 25 or even 28%. Increasing the proportion of the sulphur tends to increase the rubbery characteristic of the mixture.

For use in leveling up the unevenness of sub-floors, the amount of mineral oil in the composition can be somewhat reduced if desired, and in place of sawdust or wood flour other fillers can be employed, for example clay or sand would sometimes be suitable. These fillers obviously are not the equivalent of the starch, and are not employed for the same purpose.

It will be understood that dyes or substances for increasing or decreasing the hardness of the product can be added if desired, although ordinarily I prefer not to add such materials. It sometimes is useful to add a small amount of a dye to give the composition about the same color as the wood constituting the top flooring, for example if wood is to be laid which has been dyed brown, in imitation of mahogany, I may use a small amount, say 1% or more or less of an oil-soluble brown dye, to the composition during the making of the same, or in some cases the same result could be secured by the use of a darker colored rosin, it of course being understood that dark colored rosins are usually cheaper than the light colored rosins.

I have referred above, to the use of other "starchy" material in place of rice flour. It will be understood that there are many other vegetable products which consist largely of starch, which could be used in place of the rice flour, with the production of satisfactory compositions.

I claim:—

1. A process of making a mastic suitable for laying floor blocks and the like which comprises mixing rosin with a mineral oil of the character of motor lubricating oil, and heating the mixture to not substantially below the boiling point of water, adding molten sulfur in amount representing a minor fraction only of the amount of the rosin, and thoroughly stirring the mass, cooling same, and adding a small percentage of a dry starchy material, to give a consistency similar to that of soft wax.

2. A mastic made up from rosin and smaller amounts of mineral lubricating oil, and sulphur, and a still smaller amount of a dry starchy material.

3. A mastic made up from 50 parts rosin, 20 parts mineral lubricating oil, 20 parts sulphur and a smaller amount of dry starchy material.

4. A mastic made up from 50 parts rosin, 20 parts mineral lubricating oil, 20 parts sulphur, said composition having "rubbery" properties such as would be produced by heating a mixture of said materials, in the proportions specified, to about 216 to 253° F., while thoroughly agitating the mass, said mastic containing a smaller amount of dry starchy material.

In testimony whereof I affix my signature.

HERMAN C. NIELSEN.